United States Patent
Canfield

(10) Patent No.: US 6,501,507 B1
(45) Date of Patent: Dec. 31, 2002

(54) MULTIMODE INTERPOLATION FILTER AS FOR A TV RECEIVER

(76) Inventor: Barth Alan Canfield, 13446 Nottingham Rd., Fishers, IN (US) 46038

(*) Notice: Subject to any disclaimer, the term of this patent is extended or adjusted under 35 U.S.C. 154(b) by 0 days.

(21) Appl. No.: 09/078,160

(22) Filed: May 13, 1998

Related U.S. Application Data

(62) Division of application No. 08/666,514, filed as application No. PCT/US94/00388 on Jan. 12, 1994, now Pat. No. 5,790,197.

(51) Int. Cl.⁷ .................................................. H04N 7/01
(52) U.S. Cl. ...................... 348/441; 348/443; 348/445; 348/448; 348/440.1; 348/450; 348/453
(58) Field of Search ................................. 348/441, 445, 348/448, 440.1, 443, 450, 453, 458, 459, 554

(56) References Cited

U.S. PATENT DOCUMENTS

| | | | | |
|---|---|---|---|---|
| 3,904,817 A | * | 9/1975 | Hoffman et al. ............. 178/6.8 |
| 4,651,208 A | * | 3/1987 | Rhodes et al. ............... 358/140 |
| 4,739,390 A | * | 4/1988 | Achiha et al. ................. 358/11 |
| 4,752,826 A | * | 6/1988 | Barnett ........................ 358/140 |
| 4,845,562 A | * | 7/1989 | Koslov et al. ............... 358/141 |
| 4,866,520 A | | 9/1989 | Nomura et al. .............. 358/140 |
| 4,888,641 A | * | 12/1989 | Isnardi et al. ................ 358/141 |
| 5,194,937 A | * | 3/1993 | Lee et al. ...................... 358/11 |
| 5,212,549 A | * | 5/1993 | Ng et al. ...................... 358/135 |
| 5,253,041 A | | 10/1993 | Wine et al. .................... 358/11 |
| 5,355,328 A | * | 10/1994 | Arbeiter et al. ........... 364/724.1 |
| 5,500,577 A | | 3/1996 | Kim et al. .................... 348/450 |
| 5,592,165 A | * | 1/1997 | Jackson et al. .............. 341/143 |
| 5,602,599 A | * | 2/1997 | Greggain ..................... 348/581 |
| 5,650,824 A | * | 7/1997 | Huang ......................... 348/453 |
| 5,712,687 A | * | 1/1998 | Naveen et al. .............. 348/453 |
| 5,790,197 A | * | 8/1998 | Canfield ...................... 348/453 |
| 5,844,617 A | * | 12/1998 | Faroudja et al. ............ 348/441 |
| 5,859,651 A | * | 1/1999 | Potu ............................ 345/526 |
| 5,864,367 A | * | 1/1999 | Clatanoff et al. ........... 348/441 |
| 6,188,730 B1 | * | 2/2001 | Nagai et al. ................. 375/441 |
| 6,233,277 B1 | * | 5/2001 | Ozcelik et al. ......... 375/240.02 |

FOREIGN PATENT DOCUMENTS

| | | |
|---|---|---|
| EP | 94906596 | 12/1997 |
| WO | 91/19400 | * 12/1991 |

* cited by examiner

*Primary Examiner*—John W. Miller
*Assistant Examiner*—Paulos Natnael

(57) ABSTRACT

A multimode scan converter includes a delay element (33) for delaying one horizontal line of video signal and selectively re-displaying that line. A multiplexer (30) is arranged to selectively provide either luminance signal or chrominance signal to the delay element. Output signal from the delay element and output signal from the multiplexer are coupled to a proportioning circuit (34) which sums the two signals in complementary proportions (e.g. K and 1-K). A second multiplexer (35), which provides up-converted output luminance signal, is arranged to selectively pass the luminance signal or signal from the proportioning circuit. A third multiplexer (36), which provides up-converted output chrominance signal, is arranged to selectively pass the chrominance signal or signal from the proportioning circuit.

4 Claims, 9 Drawing Sheets

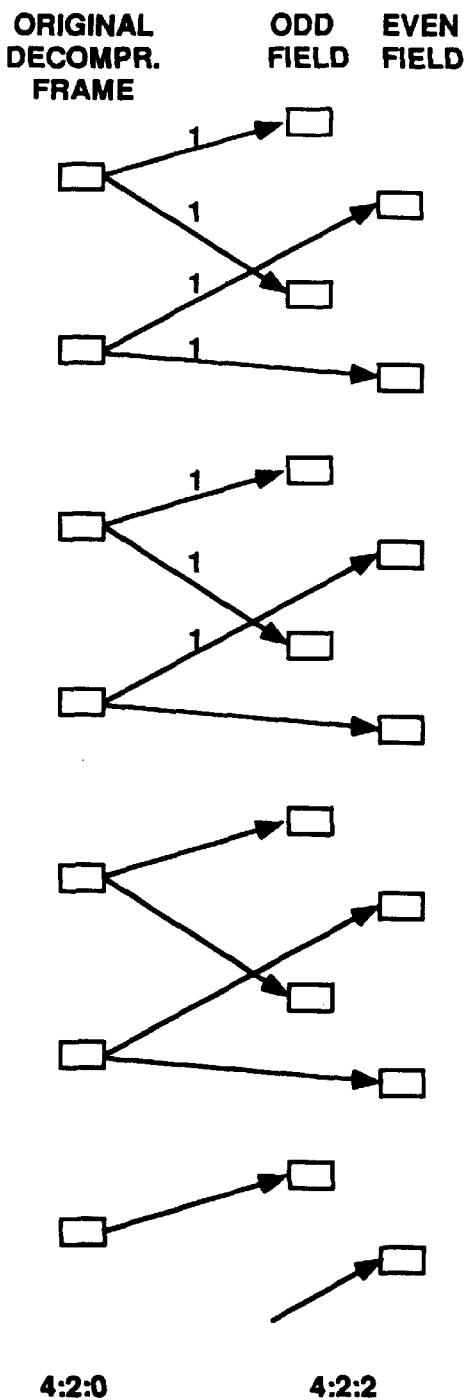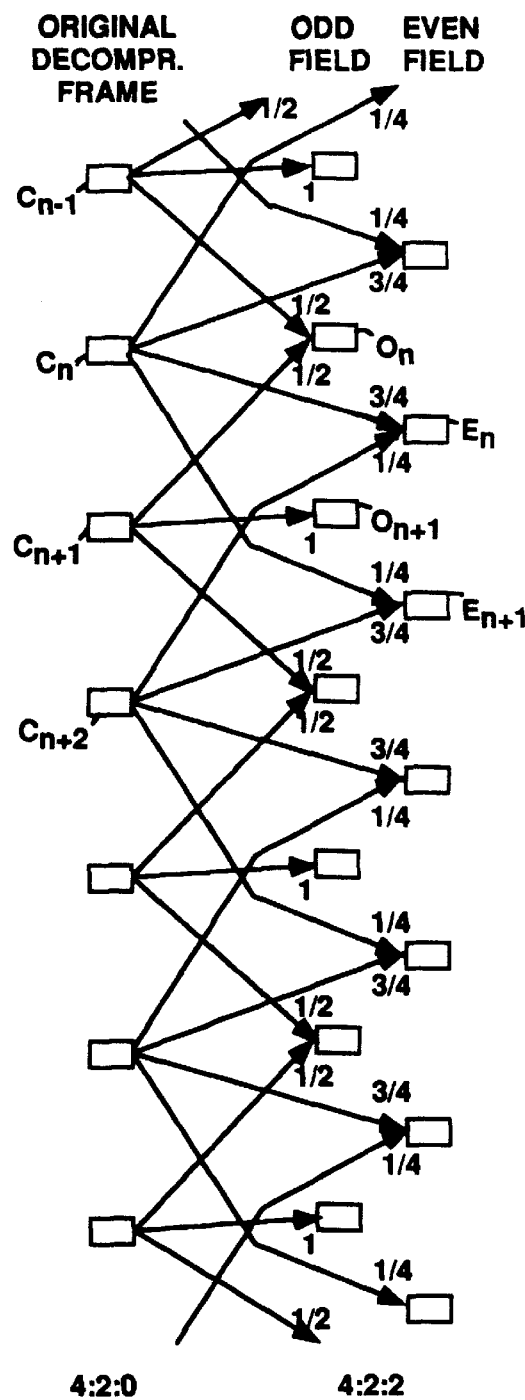
FIG. 5  FIG. 6

TABLE I

| Odd Field | | | | | | |
|---|---|---|---|---|---|---|
| Display Line | Y From Memory | C From Memory | C From line store | 1H Mux Control | F/H | K |
|  |  | C1 | ---- | NEW | F | X |
| 1 | Y1 | C1 | C1 | NEW | F | 0 |
| 3 | Y3 | C3 | C1 | NEW | F | 0 |
| 5 | Y5 | C3 | C3 | NEW | F | 0 |
| 7 | Y7 | C5 | C3 | NEW | F | 0 |
| 9 | Y9 | C5 | C5 | NEW | F | 0 |
| Even Field | | | | | | |
|  |  | C2 | ---- | NEW | F | X |
| 2 | Y2 | C2 | C2 | NEW | F | 0 |
| 4 | Y4 | C4 | C2 | NEW | F | 0 |
| 6 | Y6 | C4 | C4 | NEW | F | 0 |
| 8 | Y8 | C6 | C4 | NEW | F | 0 |
| 10 | Y10 | C6 | C6 | NEW | F | 0 |

*FIG. 17*

TABLE II

| Odd Field | | | | | | |
|---|---|---|---|---|---|---|
| Display Line | Y From Memory | C From Memory | C From line store | 1H Mux Control | F/H | K |
|  |  | C1 | ---- | NEW | F | X |
| 1 | Y1 | C1 | C1 | NEW | F | O |
| 3 | Y3 | C3 | C1 | NEW | F | 1/2 |
| 5 | Y5 | C3 | C3 | NEW | F | O |
| 7 | Y7 | C5 | C3 | NEW | F | 1/2 |
| 9 | Y9 | C5 | C5 | NEW | F | O |
| Even Field | | | | | | |
|  |  | C2 | ---- | NEW | F | X |
| 2 | Y2 | C2 | C2 | NEW | F | O |
| 4 | Y4 | C4 | C2 | OLD | F | 1/4 |
| 6 | Y6 | C4 | C2 | NEW | F | 3/4 |
| 8 | Y8 | C6 | C4 | OLD | F | 1/4 |
| 10 | Y10 | C6 | C4 | NEW | F | 3/4 |

*FIG. 11*

TABLE III

| Odd Field | | | | | | |
|---|---|---|---|---|---|---|
| Display Line | Y From Memory | C From Memory | C From line store | 1H Mux Control | F/H | K |
|  |  | C1 | ---- | NEW | F | 1 |
| 1 | Y1 | C1 | C1 | NEW | F | 1 |
| 3 | Y3 | C2 | C1 | NEW | F | 1 |
| 5 | Y5 | C3 | C2 | NEW | F | 1 |
| 7 | Y7 | C4 | C3 | NEW | F | 1 |
| 9 | Y9 | C5 | C4 | NEW | F | 1 |
| Even Field | | | | | | |
|  |  | C1 |  | NEW | F | X |
| 2 | Y2 | C2 | C1 | NEW | F | 0 |
| 4 | Y4 | C3 | C2 | NEW | F | 0 |
| 6 | Y6 | C4 | C3 | NEW | F | 0 |
| 8 | Y8 | C5 | C4 | NEW | F | 0 |
| 10 | Y10 | C6 | C5 | NEW | F | 0 |

*FIG. 12*

TABLE IV

| Odd Field | | | | | | |
|---|---|---|---|---|---|---|
| Display Line | Y From Memory | C From Memory | C From line store | 1H Mux Control | F/H | K |
|  |  | C1 | ---- | NEW | F | X |
| 1 | Y1 | C1 | C1 | NEW | F | X |
| 3 | Y3 | C2 | C1 | NEW | F | 3/4 |
| 5 | Y5 | C3 | C2 | NEW | F | 3/4 |
| 7 | Y7 | C4 | C3 | NEW | F | 3/4 |
| 9 | Y9 | C5 | C4 | NEW | F | 3/4 |
| Even Field | | | | | | |
|  |  | C1 | ---- | NEW | F | X |
| 2 | Y2 | C2 | C1 | NEW | F | 1/4 |
| 4 | Y4 | C3 | C2 | NEW | F | 1/4 |
| 6 | Y6 | C4 | C3 | NEW | F | 1/4 |
| 8 | Y8 | C5 | C4 | NEW | F | 1/4 |
| 10 | Y10 | C6 | C5 | NEW | F | 1/4 |

*FIG. 13*

TABLE V

| Odd Field | | | | | | |
|---|---|---|---|---|---|---|
| Display Line | Y From Memory | y From line store | C From Memory | 1H Mux Control | F/H | K |
|  | Y1 | XX | ---- | NEW | H | 1 |
| 1 | Y1 | Y1 | C1 | NEW | H | 1 |
| 3 | Y2 | Y1 | C1 | NEW | H | 1 |
| 5 | Y3 | Y2 | C2 | NEW | H | 1 |
| 7 | Y4 | Y3 | C2 | NEW | H | 1 |
| 9 | Y5 | Y4 | C3 | NEW | H | 1 |
| Even Field | | | | | | |
|  | Y1 | XX | ---- | NEW | H | 0 |
| 2 | Y2 | Y1 | C1 | NEW | H | 0 |
| 4 | Y3 | Y2 | C1 | NEW | H | 0 |
| 6 | Y4 | Y3 | C2 | NEW | H | 0 |
| 8 | Y5 | Y4 | C2 | NEW | H | 0 |
| 10 | Y6 | Y5 | C3 | NEW | H | 0 |

*FIG. 14*

TABLE VI

| Odd Field | | | | | | |
|---|---|---|---|---|---|---|
| Display Line | Y From Memory | Y From line store | C From Memory | 1H Mux Control | F/H | K |
|  | Y1 | XX | ---- | NEW | H | X |
| 1 | Y1 | Y1 | C1 | NEW | H | X |
| 3 | Y2 | Y1 | C1 | NEW | H | 3/4 |
| 5 | Y3 | Y2 | C2 | NEW | H | 3/4 |
| 7 | Y4 | Y3 | C2 | NEW | H | 3/4 |
| 9 | Y5 | Y4 | C3 | NEW | H | 3/4 |
| Even Field | | | | | | |
|  | Y1 | XX | ---- | NEW | H | X |
| 2 | Y2 | Y1 | C1 | NEW | H | 1/4 |
| 4 | Y3 | Y2 | C1 | NEW | H | 1/4 |
| 6 | Y4 | Y3 | C2 | NEW | H | 1/4 |
| 8 | Y5 | Y4 | C2 | NEW | H | 1/4 |
| 10 | Y6 | Y5 | C3 | NEW | H | 1/4 |

*FIG. 15*

TABLE VII

| odd field | | | | | | |
|---|---|---|---|---|---|---|
| Display Line | Y From Memory | C From Memory | C From line store | 1H Mux Control | F/H | K |
|  |  | C1 | ---- | NEW | H | X |
| 1 | Y1 | C1 | C1 | NEW | H | 1/2 |
| 3 | Y2 | C2 | C1 | NEW | H | 1/2 |
| 5 | Y3 | C2 | C2 | NEW | H | 1/2 |
| 7 | Y4 | C3 | C2 | NEW | H | 1/2 |
| 9 | Y5 | C3 | C3 | NEW | H | 1/2 |
| even field | | | | | | |
|  |  | C1 | ---- | NEW | H | X |
| 2 | Y1 | C1 | C1 | NEW | H | 1/2 |
| 4 | Y2 | C2 | C1 | NEW | H | 1/2 |
| 6 | Y3 | C2 | C2 | NEW | H | 1/2 |
| 8 | Y4 | C3 | C2 | NEW | H | 1/2 |
| 10 | Y5 | C3 | C3 | NEW | H | 1/2 |

*FIG. 16*

MULTIMODE INTERPOLATION FILTER AS FOR A TV RECEIVER

This application is a divisional application of prior application Ser. No. 08/666,514, filed on Jun. 27, 1996, now U.S. Pat. No. 5,790,197, which is a NST of PCT/US94/00388, filed Jan. 12, 1994.

This invention relates to an interpolator for scan converting decompressed video signal occurring in a plurality of alternative formats.

BACKGROUND OF THE INVENTION

With the advent of compressed video signal transmissions, it is anticipated that receiver apparatus, to be competitive, will be expected to display images in a standardized format regardless of the format of the transmitted video data. For example, video signal compressed according to the MPEG 2 format (Moving Pictures Expert Group of the International Standardization Organization) may represent images in 4:2:2 format; 4:2:0 format and various other formats. Regardless of the transmitted format, the receiver should display all images in, for example, the 4:2:2 format.

There are many known systems for performing scan conversion from one format to another. Nominally such systems are optimized to convert one specific signal format to a second specific signal format. However, in the environment of a television receiver it is not practical to include a plurality of optimized scan converters, one for each anticipated transmitted signal format. Rather a compromise approach must be taken to scan conversion, where a plurality of signal formats may be converted in a single converter apparatus with acceptable rather than optimized performance.

Consider the MPEG 2 standard which supports different compression processes as well as different resolution formats. The different compression processes include intra-frame and intra-field processing.

Raw data from an MPEG decoding process is frames of video signal. A full resolution frame (4:2:0) consists of 480 lines of luminance signal and 240 lines of chrominance signal. A half resolution (4:2:0) includes 240 lines of luminance signal and 120 lines of chrominance signal. In the full resolution mode the decoded lines may be numbered

Y1, Y2, Y3, Y4, Y5, Y6 . . . Y480

C1, C2, C3, C4, . . . C240 and in the half resolution mode the decoded lines may be numbered

Y1, Y2, Y3, Y4, Y5, Y6 . . . Y240

C1, C2, C3, C4, . . . C120.

The output of the MPEG decoder is always twice as many luminance lines as chrominance lines. However the desired output 4:2:2 display format may be represented

OY1, OY2, OY3, OY4, . . . OY480

OC1, OC2, OC3, OC4, . . . OC480.

Regardless of the original resolution, the number of chrominance lines is up-converted. In the half resolution mode, the number of luminance lines is also up-converted. The mode of up-conversion may be variable depending upon the preprocessing implemented prior to the compression process used in developing the compressed signal. Certain modes of up-conversion are more conducive to up-converting intra-fame preprocessed signal and other modes are more conducive to up-converting inter-field preprocessed signal. The present invention is an interpolator for performing just such multi-mode vertical up-conversion of video signal.

SUMMARY OF THE INVENTION

The present interpolator includes a delay element for delaying one horizontal line of video signal and selectively re-displaying that line. A multiplexer is arranged to selectively provide either decoded luminance signal or decoded chrominance signal to the delay element. Output signal from the delay element and output signal from the multiplexer are coupled to a proportioning circuit which sums the two signals in complementary proportions (e.g. K and 1-K). A second multiplexer, which provides up-converted output luminance signal, is arranged to selectively pass the decoded luminance signal or signal from the proportioning circuit. A third multiplexer, which provides up-converted output chrominance signal, is arranged to selectively pass the decoded chrominance signal or signal from the proportioning circuit.

The invention will be described in detail with the aid of the drawings wherein:

FIGS. 5–10 are pictorial representations of the relationship between original lines of video signal and up-converted video signal, for different signal formats; and FIGS. 11–17 are tables including operational parameters of the FIG. 2 apparatus.

DETAILED DESCRIPTION

The present invention will be described in terms of an MPEG signal processing environment, however it will be readily appreciated that the invention may be practiced in other signal processing environments operating with multi-mode signals.

Figure 1:
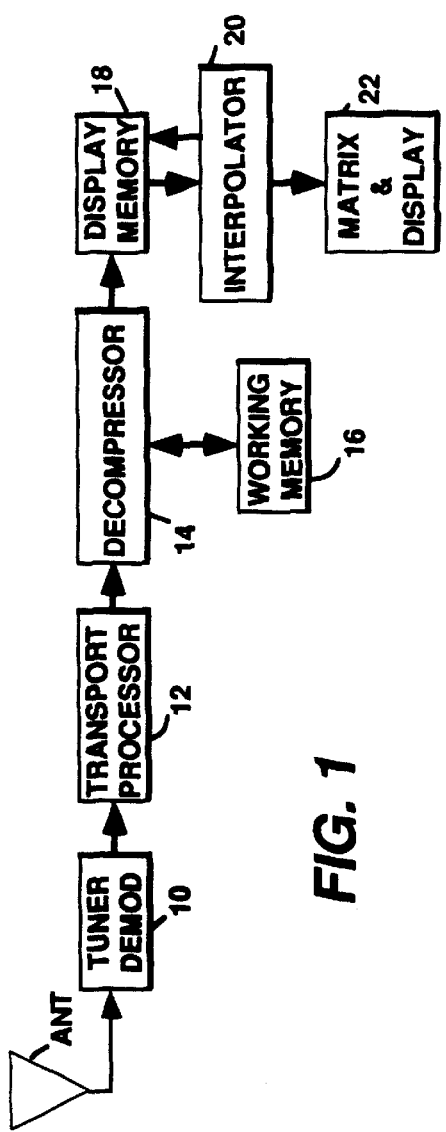
FIG. 1 is a block diagram of an exemplary receiver including an interpolator embodying the present invention.

Referring to FIG. 1 transmitted, compressed video signal from an antenna is applied to a tuner/demodulator 10, which detects transmitted signal and translates it to baseband. The baseband signal is in packetized and interleaved form to provide noise immunity for transmission. The baseband signal is applied to a transport processor 12, which de-interleaves and unpacks the compressed video data. It may also include a degree of error correction. The compressed video data from the transport processor is coupled to a decompressor 14, which, in cooperation with a working memory 16 performs, for example, an MPEG inverse compression function to generate video signal on a frame basis. That is, the decompressor generates decompressed data a frame at a time. The decompressed video signal is applied to a display memory 18 from which it may be read in raster format in interlaced fashion. The display memory is assumed to include address circuitry which is responsive to the decompressor for writing video data, and is responsive to the interpolator 20 for reading video data.

Video data, which is in the form of luminance and chrominance components, is coupled to matrix and display element 22 via the interpolator 20. The matrix and display element 22, combines the luminance and chrominance component signals to form red R, blue B, and green G signals in conventional fashion, for driving a display device. The signals from the element 10 through 20 will be processed in digital form. A digital to analog converter will be implemented either within the element 22 (prior to matrixing) or after element 22.

As mentioned previously, the transmitted compressed video data may have been encoded with a variety of different spatial resolutions, or by field or frame processing modes. The interpolator 20, is included to up-convert the various forms of decompressed video signals in the vertical spatial dimension to a 4:2:2 format.

Figure 2:
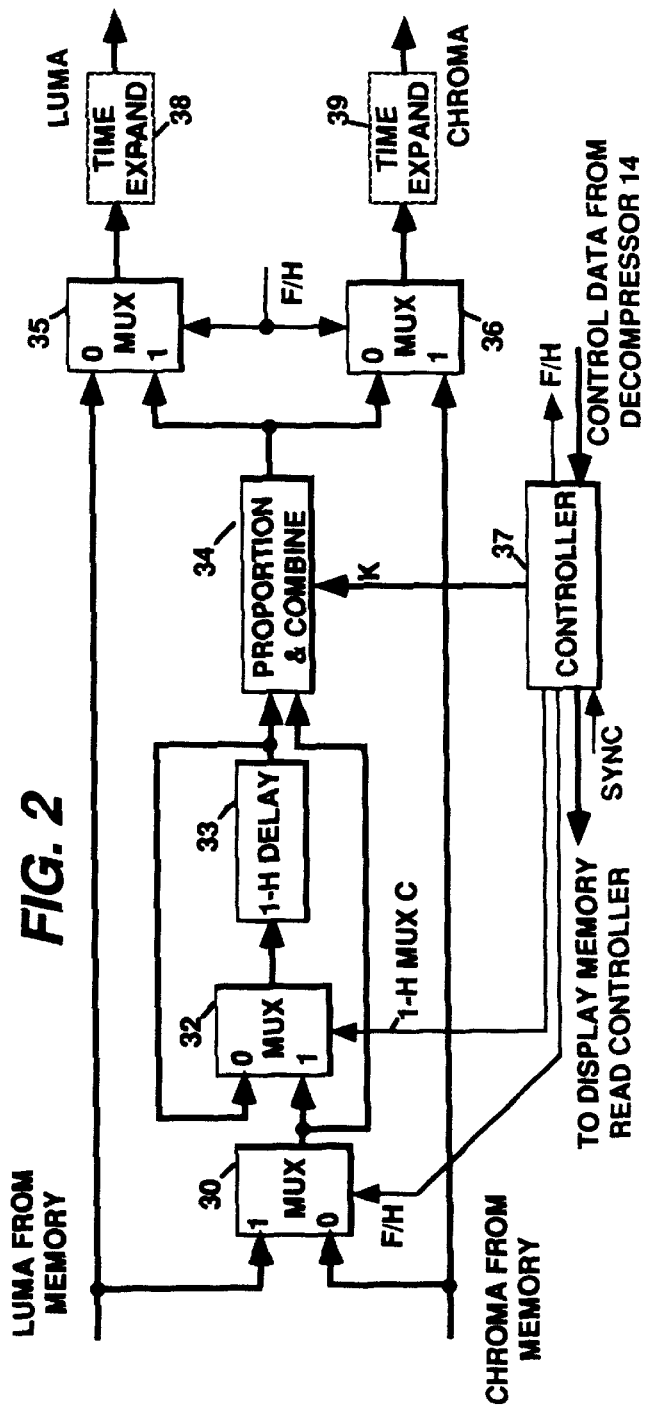
FIG. 2 is a block diagram of an exemplary embodiment of the interpolator.

FIG. 2 illustrates an example of a multimode interpolator in block form. This interpolator accepts component 4:2:0 luminance Y, and chrominance C, signals at respective input connections, and outputs component Y and C signals in 4:2:2 format. The interpolator includes a first multiplexor 35 having an output connection for providing luminance output signal. The multiplexor 35 is responsive to a full-resolution/half-resolution control signal F/H to selectively pass luminance signal directly from the luminance input terminal or from a proportioning element 34. The interpolator also includes a second multiplexor 36 having an output connection for providing chrominance output signal. The multiplexor 36 is responsive to the control signal F/H to selectively pass chrominance signal directly from the chrominance input terminal or from the proportioning element 34.

A third multiplexor 30 has first and second input terminals coupled to the luminance and chrominance input terminals respectively, and is controlled by the control signal F/H to pass one or the other of the luminance and chrominance component input signals. The output of the third multiplexor is coupled to one input terminal of a fourth multiplexor 32, and to an input terminal of the proportioning element 34.

The output connection of the fourth multiplexer is coupled to a one horizontal line (1-H) delay element 33, the output of which is coupled back to a second input terminal of the multiplexor 32. The multiplexer 32 is controlled by a 1-H MUX control signal to apply new component signals to the delay line 33, or to recirculate data already contained in the delay line 33.

The proportioning element 34 has a second input terminal coupled to an output connection of the (1-H) delay element 33, which receives signal from the fourth multiplexor 32. The proportioning element 34, proportions signal from the 1-H delay 33 and the third multiplexor 30 in complementary amounts and then combines the respective portions to generate interpolated output signal which is applied to respective input connections of the multiplexers 35 and 36. Nominally the two signals applied to element 34 correspond to two successive horizontal lines. Signal from these two lines are combined in the proportions K and 1-K, where K is typically a factor less than one.

The compressed MPEG data received by the antenna includes control information associated with compressed frames, which control information indicates whether the current frame was preprocessed via field or frame techniques before MPEG compression, and the resolution of the compressed frame. The decompressor 14 extracts this control information in order to configure the decompressor 14 for decompressing the current frame of compressed data. The decompressor 14 will include sufficient hardware and software to perform the inverse of all of the compression processes supported by the MPEG standard.

The control information is passed from the decompressor 14 to the controller 37. The controller 37, responsive to the frame control information produces the factors K by which the respective signals are proportioned or weighted. The appropriate K factors, may be provided, from for example, an internal read only memory (ROM) table (not shown) which is addressed by the appropriate control information extracted by the decompressor. The controller 37 also provides the appropriate signals for controlling the respective multiplexers to selectively pass the appropriate component signals.

Multiplexers 30, 35 and 36 pass signal applied to their respective "O" input connections when the F/H control signal is in a first (F) state and pass signal applied to their "1" input connections when the F/H signal is in a second opposite (H) state. The multiplexer 36 will therefore pass signal from the element 34 when multiplexer 35 is passing luminance signal from memory to element 38 and multiplexer 30 is passing chrominance signal from memory to multiplexer 32. Alternatively the multiplexer 35 will pass signal from the element 34 when multiplexer 36 is passing chrominance signal from the memory to element 39 and multiplexer 30 is passing luminance signal from the memory to multiplexer 32.

Note that the multiplexer 32 and delay line 33 may be replaced with random access memory of sufficient storage capacity to hold one line of signal and is of the type which can be read without destroying data such that the same line of data may be read from the memory a plurality of times. The function of the multiplexer 32 in this instance will be effected by selective application of a write enable to the random access memory.

Figure 3:
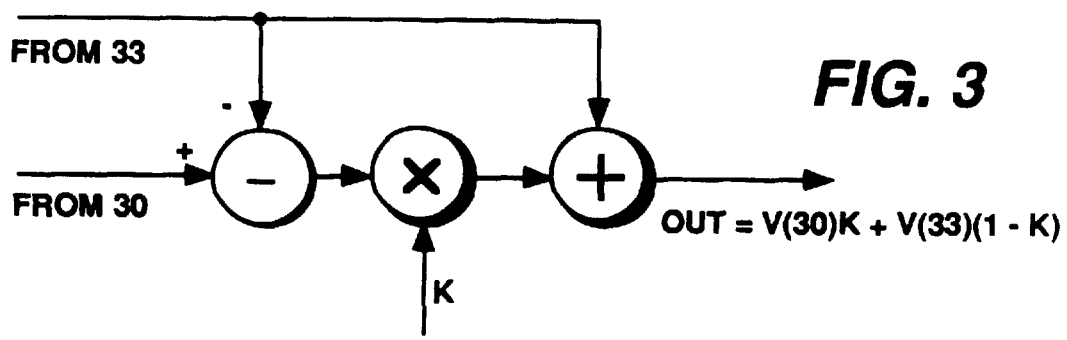
FIGS. 3 and 4 are schematic diagrams of exemplary proportioning and summing circuitry.
Figure 4:
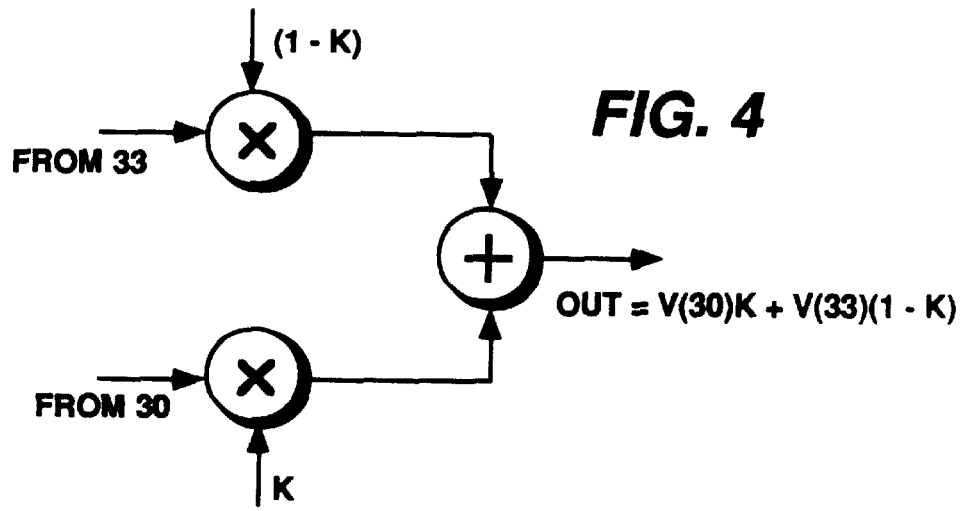

FIGS. 3 and 4 illustrate in schematic form two alternative circuit arrangements for the proportioning and combining element 34. The circuit of FIG. 3 is generally simpler as it requires but one multiplier and only the control signal K, whereas the FIG. 4 arrangement incorporates two multipliers and requires two control signals K and (1-K). Operation of these circuits will not be described as both circuits are well known. Suffice it to say that for the K values indicated in the below listed Tables I–VII, signal from the line store 33 is weighted by the factor 1-K and signal provided from the multiplexer 30 is weighted by the factor K.

In general, the multiplexer control signal F/H remains static over respective data sequences, e.g., groups of pictures GOP's etc. That is, the F/H signal is set at a high or low level at the beginning of a frame and remains in that state at least for the duration of an entire frame. In the case where half resolution data is transmitted, there is a mode wherein the F/H control signal may undergo a high-low change each pixel period or alternatively each line period.

The interpolator 20 up-converts data in the vertical direction either by;
1) repeating lines, which simply involves repeating the same line from the display memory 18 twice in succession;
2) by repeating fields, which involves repeating the appropriate alternate lines in succession (i.e., fields) from the display memory twice;
3) by interpolating interstitial horizontal lines from nearby horizontal lines of signal for the display memory.; or
4) repeating lines and fields.

In the full resolution modes, the luminance component requires no up-conversion, hence the luminance signal will simply be passed unaltered from the display memory via the multiplexor 35. The chrominance signal requires a 1:2 vertical up-conversion. The apparatus of FIG. 2 allows for generating up-converted chrominance signal in two modes; repeating lines, and/or fields, or interpolating lines from real lines. The latter process is preferred because apparent higher resolution signal is produced.

Refer to FIGS. 5–10. The leftmost column of boxes are intended to represent lines of a decompressed interlaced frame of video signal, which frame is available to the interpolator 20 from the display memory 18. Alternate lines represent even and odd fields of the interlaced frame. The middle column of boxes is intended to represent the up-converted odd field of interlace scanned output signal provided by the interpolator 20 and the rightmost column of boxes is intended to represent the up-converted even field of interlace scanned output signal. The arrows pointing from a box in the left column indicate the line of decompressed video from which a line of output video is generated in either the middle or right columns. A number associated with an arrow indicates the contributing proportion of the signal from the original decompressed video used in forming one of the odd or even fields. A number 1 means a 100% contribution i.e., a line repeat.

Consider first that the received signal is full resolution and was compressed by field processing. In field processing, the lines of respective fields of respective compressed frames are compressed independently. As a result the respective fields of decompressed frames are relatively independent. As such it is desirable to up-convert respective fields independently. FIG. 5 illustrates the process of line repeat up-conversion for field compressed chrominance. Alternate lines of the decompressed frame are repeated to generate the 1:2 up-converted odd output field and intervening lines of the decompressed frame are repeated to generate the 1:2 up-converted even output field.

Table I in FIG. 17 shows the memory access requirements and implicitly the interpolator multiplexing configuration. Table I (and Tables II–VII) indicate the manner in which a programmable controller 37 will provide respective K factors, configure the respective multiplexers, and condition the display memory to provide lines of component video signals for the current frame of video signal being processed. The controller 37 may be a reconfigurable state machine which is configured by respective subroutines or ROM data initiated by the control signals provided by the decompressor 14.

In Table I, the 1-H control signal is in the NEW state to condition the multiplexer 32 to pass data from the multiplexer 30 to the 1-H delay line (line store). The control signal F/H is in the F state to condition the multiplexers 35, 36 and 30 to pass signal applied to their respective "O" input connections. Thus multiplexer 35 passes luminance lines from the display memory (Y from Memory) in a normal line to line sequence Y1, Y3, Y5, Y7, . . . etc. for the odd fields and Y2, Y4, Y6, Y7, . . . etc. for even fields. Multiplexer 30 is conditioned to pass chrominance signal from the display memory (C from Memory) 18 to the multiplexer 32-delay line 33 circuit and to element 34, and the multiplexer 36 is conditioned to pass signal from the element 34. The control signal K is zero, hence the signals from elements 33 and 30 are combined in the ratio of 1:0, i.e., multiplexer 36 is effectively passing chrominance from the display memory delayed by one line interval. In order to maintain the luminance and chrominance in proper vertical spatial relation, the first line of chrominance signal in both odd and even fields are read from the display memory one line time prior to the first line of luminance signal for the respective field. Every other line of chrominance signal from the display memory 18 is read from the display memory twice. Note in Table I, the chrominance values in bold print are the values output by the interpolator 20 in the respective odd and even fields.

Assuming the display memory stores a line of signal per vertical memory address, reading lines twice is effected by advancing the vertical memory addresses to the chrominance portion of the display memory once for every two vertical addresses applied to the luminance portion of the display memory.

FIG. 6 illustrates the interpolation alternative to full resolution field processed chrominance 1:2 up-conversion. As with the FIG. 5 processing, up-converted odd and even fields are respectively generated from odd and even lines of the decompressed frames. However odd and even output fields are generated differently. Every other odd output field line is equal to an odd field line of the decompressed frame The intervening output odd field lines are generated from the average of the two odd field lines between which it is disposed. For example output odd field line $O_n=\frac{1}{2}C_n-1+\frac{1}{2}C_n+1$ where $C_n-1$ and $C_n+1$ correspond to the respective chrominance signal values of the odd lines of the decompressed frame above and below output chrominance line $O_n$. Odd chrominance output lines $O_n-1$ and $O_n+1$ are respectively equal to $C_n-1$ and $C_n+1$.

Refer to the odd field portion of the FIG. 11 Table II. It is seen to be the same as that in Table I except for the K values. In odd field display lines which have a "O" K value, the chrominance signal from the line store 33 is output unaltered. For example chrominance signal for display line 1 of the odd field is signal C1. In odd field display lines which have a K value different from "O", the chrominance signal is K times the signal from the line store (C1) plus (1-K) times the signal from Memory (i.e., from the multiplexer 30). For odd field display line 3, since K is equal to ½, the chrominance signal is ½ times C1 plus ½ times C3.

Respective even field output lines are each generated from two decompressed even field lines in different proportions. For example in FIG. 6 even output line $E_n$ is generated from decompressed chrominance lines $C_n$ and $C_n+2$ in the proportions ¾ and ¼ respectively. The next even output chrominance line $E_n+1$ is generated from the decompressed even frame lines $C_n$ and $C_n+2$ in the proportions ¼ and ¾ respectively.

Refer to the even field portion of Table II in FIG. 11. From the 1-H control column it is seen that the multiplexer 32 is conditioned to recirculate data in the line store every other line period. Operating in this fashion results in pairs of lines $C_n$ and $C_n+2$ occurring in two display line intervals. Note the pairs of signals in successive lines in the columns labeled "C from Memory" and "C from line store". After the initial line is output the K value alternates between ¼ and ¾. The signals for lines 4, 6 and 8 are:

$C_4=\frac{3}{4}C2+\frac{1}{4}C4$ $C_6=\frac{1}{4}C2+\frac{3}{4}C4$ $C_8=\frac{3}{4}C4+\frac{1}{4}C6$ etc.

Figure 7:
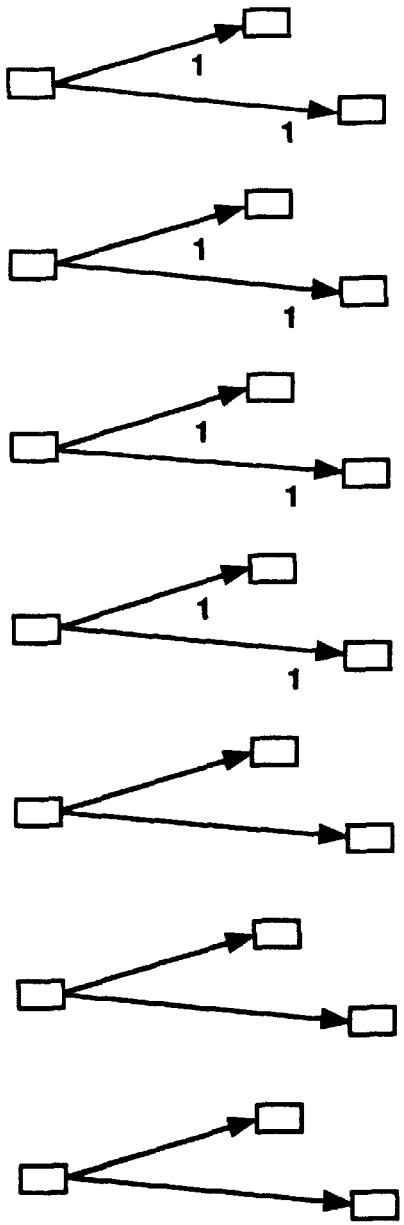

FIG. 7 illustrates the mode of 1:2 up conversion of chrominance for full resolution signal generated via frame rather than field processes. The method shown represents field repeat. That is, all of the half vertical resolution chrominance lines of the decompressed frame are simply output as the odd field lines during the odd field interval, and the same lines are output as even field lines during the even field interval.

Table III of FIG. 12 illustrates the multiplexer control status. The multiplexers 35, 36 and 30 are conditioned by the signal F/H to pass luminance from Memory, signal from element 34 and chrominance from Memory respectively. During odd fields the signal K is 1, and therefore the C signal from the line store and the C signal from Memory are combined in the proportions 0:1 respectively. Thus the multiplexer 36 is essentially passing signal from the output of the multiplexer 30. Alternatively, during the even fields with K equal to "0", the multiplexer 36 is passing signal from the multiplexer 30 but delayed one line interval. In Table III the chrominance lines in bold print are the chrominance lines that are output during the odd and even fields.

Figure 8:
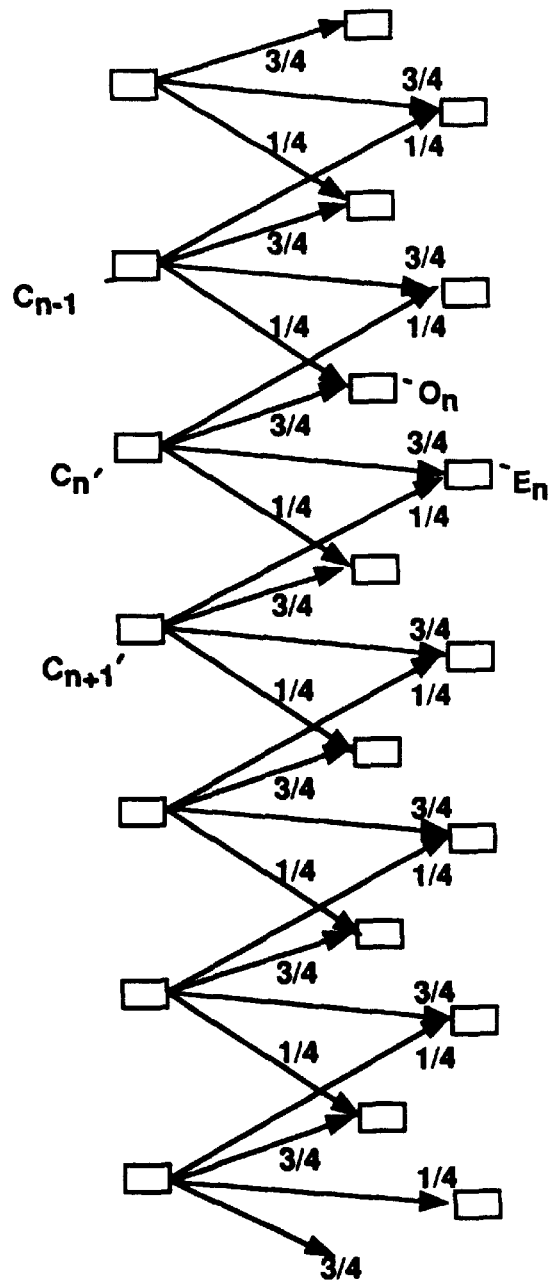

FIG. 8 shows in pictorial form the interpolation algorithm for generating odd and even up converted chrominance fields from frame compressed signal. Odd field output lines are generated from both even and odd decompressed frame lines and even field output lines are generated from both even and odd decompressed frame lines. Each odd field line is generated from pairs of frame lines in the proportions ¼:¾. Respective interlace even field lines are generated from like pairs of decompressed frame lines in the proportions ¾:¼.

Table IV in FIG. 13 shows the respective signals involved in the interpolation algorithm and the control signal configuration. Note that all chrominance lines are read in succession from the display memory for both even and odd fields, not even lines for the even field and odd lines for the odd field. The configuration is the same as in Table III with the exception of the sequence of K values. All K values in the odd field portion are ¾, thus the odd output field lines $CO_n$ are generated according to;

$CO_n = ¼C_{n-2} + ¾C_{n-1}$ and all even output field lines $CE_n$ are generated according to;

$CE_n = ¾C_{n-2} + ¼C_{n-1}$.

Figure 9:
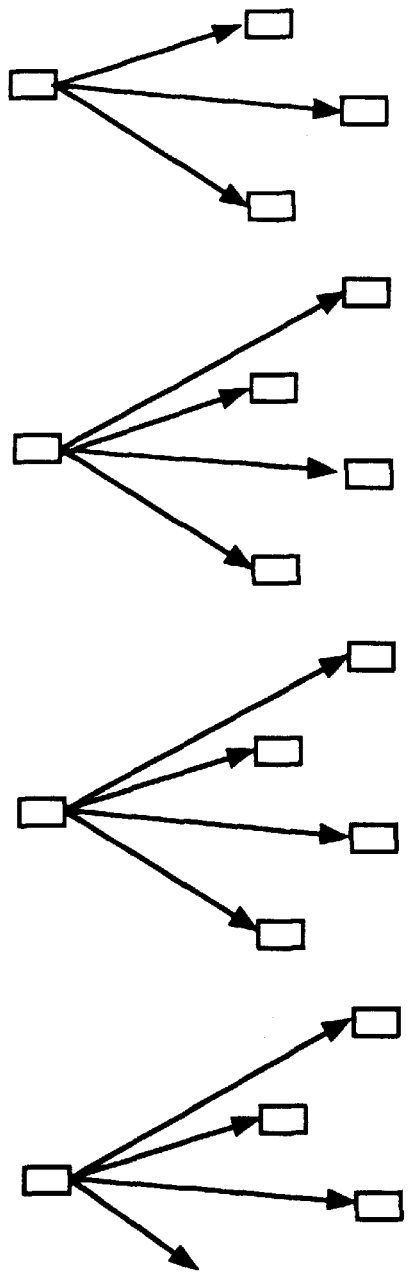

Consider the half resolution compression mode. A 1:4 vertical chrominance up conversion and a 1:2 vertical luminance up conversion is required to generate 4:2:2 signals. Since the eye is less sensitive to color than it is to brightness, it is preferred to interpolate luminance and simply repeat chrominance. FIG. 9 shows pictorially the 1:4 chrominance up-conversion. What is shown is that all (both odd and even) of the chrominance lines of the decompresses half resolution signal are repeated twice to produce output odd field lines, and then repeated twice to produce output even field lines.

The luminance component is 1:2 vertically up converted in the same manner that chrominance was 1:2 up converted in the field repeat mode.

The interpolator configuration for this half resolution processing is illustrated in Table V of FIG. 14. The luminance portion of Table V is similar to the chrominance portion of Table III. Note however that multiplexer 36 is conditioned to pass chrominance lines directly from the display memory 18; multiplexer 35 is conditioned to pass luminance signal from the element 34; and the multiplexer 30 is conditioned to pass luminance signal from the display memory to the multiplexer 32-line store 33 circuitry.

Table VI of FIG. 15 illustrates the half resolution mode of operation wherein all chrominance lines are repeated in both odd and even fields and luminance is interpolated rather than field repeated.

Figure 10:
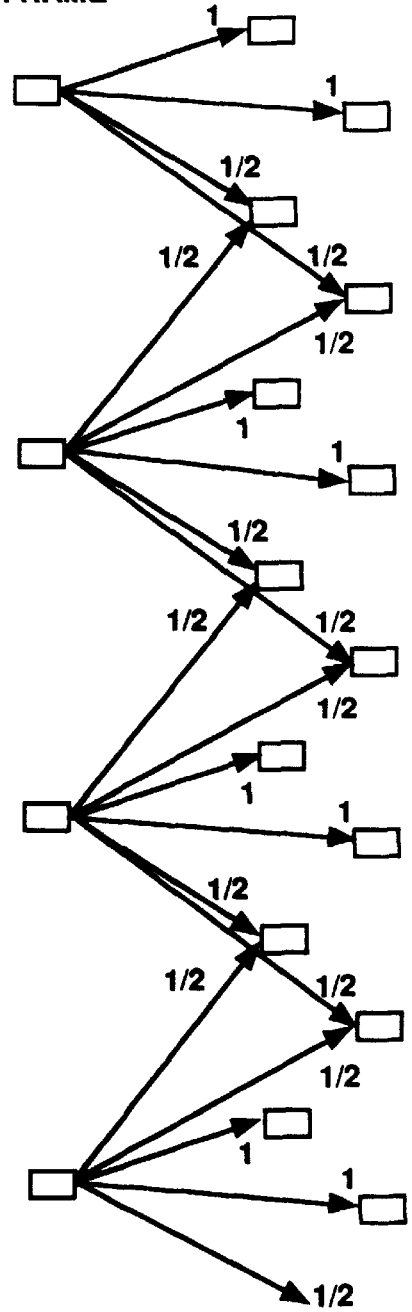

FIG. 10 and Table VII of FIG. 16 illustrate a half resolution chrominance filtering and field repeat luminance mode.

A half resolution mode wherein both the chrominance and the luminance components may be interpolated is implemented by time division multiplexing the interpolator on a pixel basis, if vertical up conversion is performed prior to horizontal up conversion. In the half resolution mode only half the number of samples are included per horizontal line. There is sufficient storage in the delay element 33 to hold a half resolution line of both chrominance and luminance components. Thus it is possible to interleave the luminance and chrominance samples pixel-by-pixel, and to independently interpolate both the chrominance and luminance signals. Deinterleaving of the interpolated components is performed by the multiplexers 35 and 36. This operation is effected by clocking the F/H signal with a pixel rate clock (input pixel rate). The K values requisite for the desired interpolation function, which may be any of the prior described interpolation functions, would also be time multiplexed to the element 34.

Alternatively the luminance and chrominance signals may be interleaved or multiplexed on a line basis. In this instance a line of luminance and a corresponding line of chrominance components are time division multiplexed in separate portions of a single line time. This time division multiplexing may be performed by clocking the signal F/H at a line rate. Demultiplexing of the interpolated luminance and chrominance components is performed by the multiplexers 35 and 36 controlled by the line rate control signal F/H. The K values quisite for the desired interpolation function, which may be any of the prior described interpolation functions, would also be time multiplexed to the element 34.

In the latter alternative mode, the output interpolated lines of the chrominance and luminance components will be compressed into e.g., half line periods. To expand these signals to full line periods, respective time expansion circuits 38 and 39 are included at the output connections of the respective multiplexers 35 and 36. Time expansion circuits or raster mappers are well known and their operation will not be described herein.

I claim:

1. Apparatus for providing data at resampled rates comprising:

a signal input port;

a multiplexer having first and second input ports and an output port said first input port being coupled to said signal input port;

a delay element for delaying data corresponding to one horizontal line having an input port coupled to the output port of said multiplexer and having an output port coupled to the second input port of the multiplexer;

an interpolator having a first input port coupled to the output port of the delay element, a second input port coupled to said signal input port, and an output port at which resampled data is available, said interpolator scaling data available at its respective input ports and combining the scaled data to provide said resampled data; and a controller coupled to a control input port of said interpolator for selecting respective scale factors and coupled to a control input port of said multiplexer for conditioning the multiplexer to selectively recycle horizontal lines of data.

2. The apparatus set forth in claim 1 wherein said interpolator comprises:

a cascade connection of a first additive combiner, a scaling element and a second additive combiner, the first additive combiner having first and second input ports respectively coupled to the signal input port and the output port of the delay element, the second additive combiner having an input port coupled to the output port of the delay element and said scaling element having a scale factor input port coupled to said controller.

3. The apparatus set forth in claim 2 wherein said first additive combiner is a subtractor.

4. The apparatus set forth in claim 1 wherein said interpolator comprises:

a first scaling circuit having and input coupled to said signal input port, a control input coupled to said controller and an output port;

a second scaling circuit having and input coupled to the output port of said delay element, a control input coupled to said controller and an output port;

an additive combiner having first and second input port respectively coupled to the output ports of the first and second scaling circuits, and having an output port for providing said resampled data.

* * * * *